Sept. 8, 1936.  F. D. BRADDON  2,053,693
FLAW DETECTOR FOR TUBULAR CONDUCTORS
Filed Nov. 10, 1933
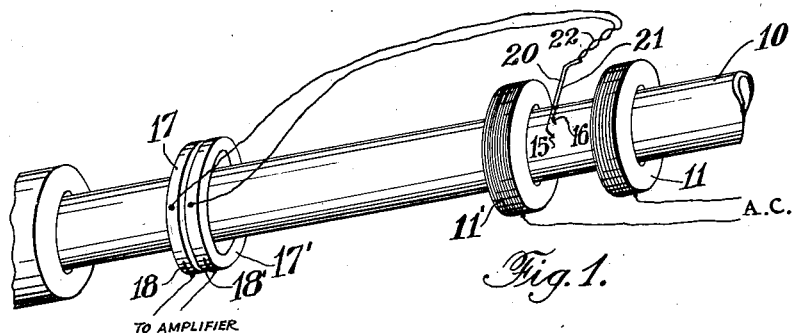
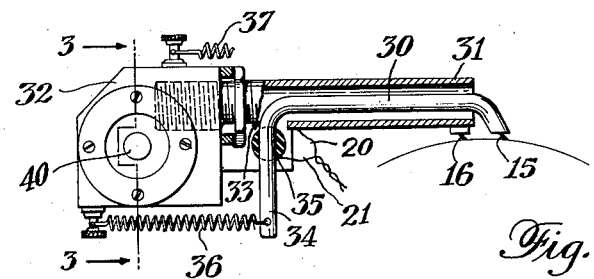
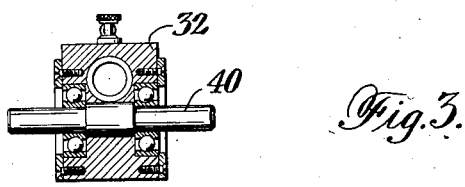
Inventor
FRED D. BRADDON
By Joseph N. Lipschutz
Attorney Patented Sept. 8, 1936

2,053,693

UNITED STATES PATENT OFFICE 2,053,693

FLAW DETECTOR FOR TUBULAR CONDUCTORS

Fred D. Braddon, Eltingville, N. Y., assignor to Sperry Products, Inc., Brooklyn, N. Y., a corporation of New York Application November 10, 1933, Serial No. 697,404

5 Claims. (Cl. 175—183)

This invention relates to the detection of defects in tubular conductors and, more particularly, defects in the lead sheaths surrounding power-cables. The general principle of operation of this invention is similar to that in my joint copending patent with Francis H. Shepard, Jr., No. 1,946,189, granted February 6, 1934, and consists in causing potential contacts to traverse a spiral path around the periphery of a tubular conductor, such as the lead sheath covering of power cables, through which current is passed, to detect any variations in normal potential drop caused by flaws such as variations in the thickness of the conductor wall, that is, eccentricities in the wall which will yield a greater or lesser drop in potential than a portion of the wall having a normal thickness.

It is the principal object of my invention to provide an improvement in the construction of the contacts whereby many of the difficulties heretofore experienced and which will be pointed out hereinafter have been remedied.

Further objects and advantages of this invention will become apparent in the following detailed description.

In the accompanying drawing,

Fig. 1 is a perspective view illustrating the principle involved in my invention.

Fig. 2 is a side elevation, partly sectioned vertically, illustrating the type of contact construction constituting my invention.

Fig. 3 is a section taken substantially on the line 3—3 of Fig. 2.

Referring first to Fig. 1, there is illustrated the general principle of testing tubular conductors for flaws such as eccentricities. This comprises passing current through the conductor 10 under test, as by means of inducing coils 11, 11' which may be supplied with current from any suitable alternating current source to pass flux through the conductor 10. Means for passing current from a direct current source may be supplied by brushes engaging conductor 10. If there is caused to operate over the surface of conductor 10 a pair of potential contacts 15, 16 it will be seen that said contacts, if maintained in constant relation to each other, will normally measure a constant potential drop between the said contact points. Said contacts are shown around the circumference of tubular conductor and as said contacts are caused to traverse a path around the circumference of tubular conductor 10, the potential drop measured by said contacts will be constant provided there are no flaws present, one of the principal flaws being eccentricity of the wall of the tube. The potential drop between contacts 15 and 16 may be transmitted to commutator rings 17, 17', from which the drop in potential may be taken off by brushes 18, 18' and suitably amplified by a thermionic amplifier the output of which may be caused to actuate any suitable indicating system such as a signal or a pen or pens operating on a traveling chart.

Referring now to Fig. 1 it will be seen that the contacts 15, 16 together with their leads 20, 21 and the portion of the conductor under test extending between contacts 15 and 16 form a closed loop which picks up any variations in flux from whatever source, as for instance, the variations in flux in the coils 11, 11', to induce an E. M. F. which is then transmitted to the amplifier and thus introduces an error since it yields an indication similar to that of a flaw in the conductor where none in fact exists. In order to minimize this inductive effect produced by the loop thus formed, the procedure was resorted to of twisting the leads 20 and 21 together as at point 22 as close to the contact points 15, 16 as possible in order that the loop might be as small as possible. The leads 20 and 21 are, however, relatively rigid, and to prevent the stiffness in said leads from lifting contacts 15 and 16 away from the conductor it was necessary to apply considerable spring pressure to hold the contacts 15 and 16 in engagement with the conductor. Since the contact points are preferably sharp this resulted in scoring of the surface of the conductor, and, in the case of lead sheaths where the surface of the conductor under test is relatively soft, it resulted in a substantial marring of the outer surface of the lead sheath cover of the cable.

In order to obviate the above objectionable results which flowed from the attempts to reduce the size of the loop, and hence the inductive effect, to a minimum, I have provided the type of contact construction disclosed in Figs. 2 and 3. In this form of my invention the contacts 15 and 16 are fixed to the outer ends of cylindrical supports 30 and 31 arranged concentrically, one within the other. The inner support may be a rod or a tube. If desired, the contacts may be formed integral with their supports. The concentric arrangement avoids the formation of any substantial loop which might possibly pick up stray flux and thus set up induction.

This arrangement further enables me to avoid the defect described above, namely, that due to the necessity of applying considerable pressure to the contact points to overcome the stiffness in the leads. I achieve this result by mounting the contact holders 30 and 31 on a pivoted frame 32 adapted to swing around a shaft 40. The outer tube 31 may be threaded into the frame 32 and may be provided with a cut-away portion 33 through which the inner contact holding tube 30 may extend. Said last named tube may be provided with a bent arm 34 extending through the cut-out portion 33 and may be pivoted in the frame at 35 close to the pivot 40. A spring 36 connected between the frame 32 and the downwardly extending arm 34 may cause contact 15 to be applied with the desired degree of pressure, but since the leads 20 and 21 are connected to holders 31 and 30 closely adjacent the pivots 40 and 35 and twisted together close to said pivots to keep the loop small, any rigidity in said loop will exert only a slight torque on the contacts 15 and 16. A spring 37 may be provided between the frame 32 and a frame (not shown) within which pivot 40 is pivotally mounted, whereby said holder 31 applies the proper pressure to contact 16.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector for tubular conductors, means for passing current through said conductor, a pair of potential contacts adapted to engage the surface of said conductor and traverse the same, and supports for said contacts, said supports being substantially concentrically arranged.

2. In a flaw detector for tubular conductors, means for passing current through said conductor, a pair of potential contacts adapted to engage the surface of said conductor and traverse the same, and supports for said contacts, said supports being arranged one within the other and out of electrical contact with each other.

3. In a flaw detector for tubular conductors, means for passing current through said conductor, a pair of potential contacts adapted to engage the surface of said conductor and traverse the same, and supports for said contacts, one of said supports being tubular and the other of said supports being disposed within said first support and out of electrical contact therewith.

4. In a flaw detector for tubular conductors, means for passing current through said conductor, a pair of potential contacts adapted to engage the surface of said conductor and traverse the same, supports for said contacts, said supports being arranged one within the other and out of electrical contact with each other, each of said supports being pivotally mounted, and conducting leads connected to said supports adjacent the pivots.

5. In a flaw detector for tubular conductors, means for passing current through said conductor, a pair of potential contacts adapted to engage the surface of said conductor and traverse the same, supports for said contacts, said supports being arranged one within the other and out of electrical contact with each other, each of said supports being pivotally mounted, conducting leads connected to said supports adjacent the pivots, and means for biasing each of said contacts into engagement with said conductor.

FRED D. BRADDON.